(12) United States Patent
Friscioni

(10) Patent No.: US 9,783,164 B2
(45) Date of Patent: Oct. 10, 2017

(54) WINDSCREEN WIPER DEVICE

(75) Inventor: Thomas Friscioni, Aumetz (FR)

(73) Assignee: Federal-Mogul S.A., Aubange (BE)

( * ) Notice: Subject to any disclaimer, the term of this patent is extended or adjusted under 35 U.S.C. 154(b) by 393 days.

(21) Appl. No.: 14/401,025

(22) PCT Filed: May 14, 2012

(86) PCT No.: PCT/EP2012/058903
§ 371 (c)(1),
(2), (4) Date: Apr. 13, 2015

(87) PCT Pub. No.: WO2013/170877
PCT Pub. Date: Nov. 21, 2013

(65) Prior Publication Data
US 2015/0217729 A1    Aug. 6, 2015

(51) Int. Cl.
*B60S 1/38* (2006.01)
*B60S 1/40* (2006.01)

(52) U.S. Cl.
CPC ............ *B60S 1/386* (2013.01); *B60S 1/4087* (2013.01); *B60S 2001/3898* (2013.01); *Y10T 29/49876* (2015.01)

(58) Field of Classification Search
CPC .............................. B60S 1/4087; B60S 1/386
USPC ....................................................... 15/250.32
See application file for complete search history.

(56) References Cited

U.S. PATENT DOCUMENTS

2010/0017994 A1    1/2010    Boland
2010/0154158 A1    6/2010    Boland

FOREIGN PATENT DOCUMENTS

CN             202163400 U    3/2012
WO    WO 2007/122568 A2    11/2007

*Primary Examiner* — Andrew A Horton
(74) *Attorney, Agent, or Firm* — Robert L. Stearns; Dickinson Wright, PLLC

(57) ABSTRACT

A windscreen wiper device includes a wiper blade having at least one groove, in which a longitudinal strip is disposed. A connecting device for an oscillating arm includes, at least two parts provided with protrusion/hole features arranged for detachably connecting the parts together through a snapping operation. The first part is retained onto the wiper blade and the second part comprises a channel arranged for inserting the oscillating arm therein.

10 Claims, 4 Drawing Sheets

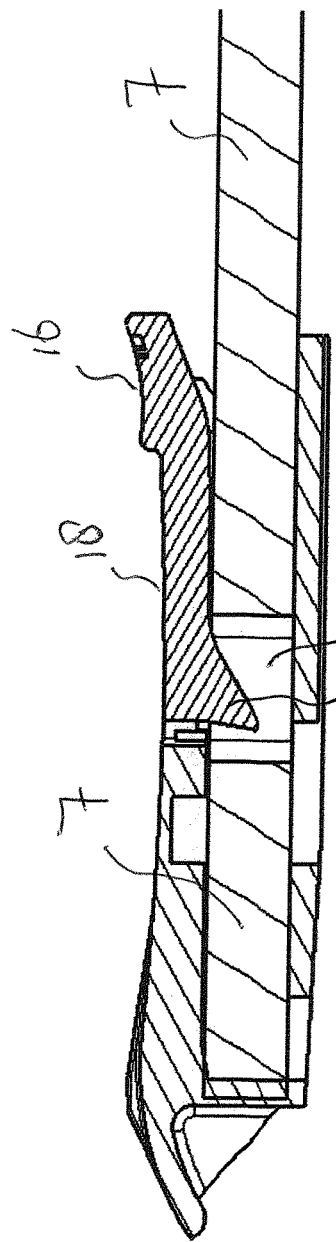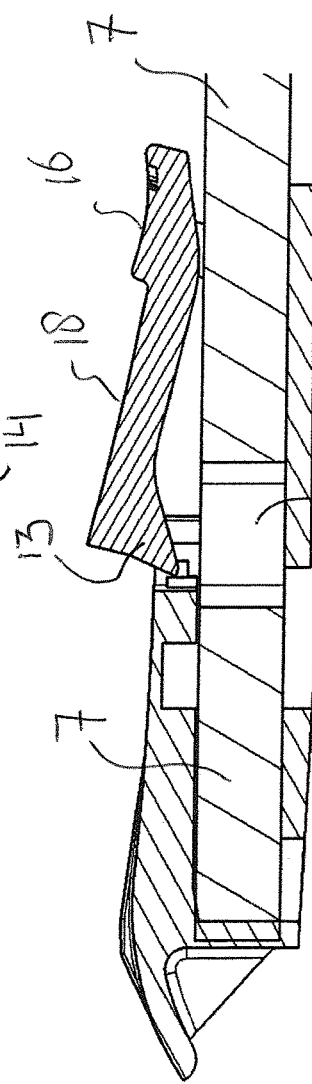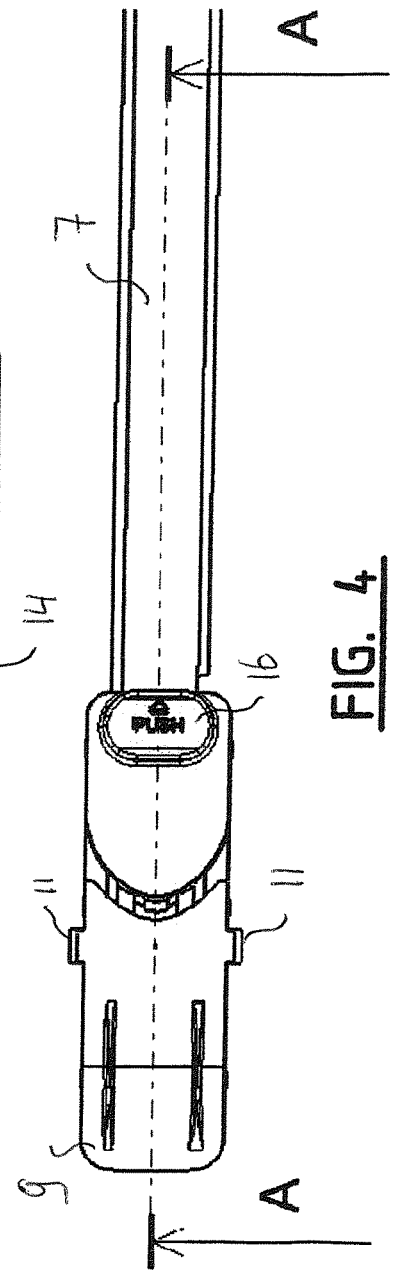
FIG. 4
FIG. 5

WINDSCREEN WIPER DEVICE

BACKGROUND OF THE INVENTION

1. Technical Field

The present invention relates to a windscreen wiper device comprising an elastic, elongated carrier element, as well as an elongated wiper blade of a flexible material, which can be placed in abutment with a windscreen to be wiped, which wiper blade includes at least one groove, in which groove a longitudinal strip of the carrier element is disposed, wherein ends of the longitudinal strip are connected by a respective connecting piece, which windscreen wiper device comprises a connecting device for an oscillating arm, wherein the oscillating arm can be pivotally connected to the connecting device about a pivot axis near one end.

2. Related Art

Such a windscreen wiper device is generally known. This prior art windscreen wiper device is designed as a "yokeless" wiper device or "flat blade", wherein no use is made of several yokes pivotally connected to each other, but wherein the wiper blade is biassed by the carrier element, as a result of which it exhibits a specific curvature.

In practice it has become apparent that, during use of the known windscreen wiper device, high forces are exerted on the connection between the connecting device and the oscillating arm. As a consequence thereof the wiper blade may get loose from the oscillating arm.

SUMMARY OF THE INVENTION

The object of the invention is to provide a windscreen wiper device, wherein the connecting device and the oscillating arm are connected in an improved manner, using a minimum of parts.

Thereto, a windscreen wiper device of the type referred to in the introduction is characterized according to the invention in that the connecting device comprises at least two parts provided with protrusion/hole means arranged for detachably connecting the parts together through a snapping operation, wherein the first part is retained onto the wiper blade and wherein the second part comprises a channel arranged for inserting the oscillating arm therein, wherein the windscreen wiper device is provided with retaining means arranged for retaining the connecting device onto the oscillating arm, wherein the retaining means comprises at least one downwardly extending protrusion on the second part, wherein the protrusion is movable between an inward position, wherein in mounted position the protrusion engages into a correspondingly shaped hole provided in the oscillating arm and the connecting device is retained onto the oscillating arm, and an outward position, wherein in a dismounted position the protrusion disengages from the hole provided in the oscillating arm and the connecting device is released from the oscillating arm.

Preferably, the second part is made of plastic, wherein a part of a top wall of the second part containing the downwardly extending protrusion is allowed to hinge about a hinge axis, preferably upon activating or deactivating (particularly using a finger) a push button on the part of the top wall. More in particular, the part of the top wall comprises at a bottom side thereof the downwardly extending protrusion, as well as at a top side thereof the push button. By activating or deactivating the push button, a hinge movement or "seesaw movement" is realized. The protrusion and the push button are preferably located at opposite ends of the part of the top wall of the second part. Particularly, the part of the top wall of the second part is allowed to hinge along two lateral hinges on opposite sides of the oscillating arm. The hinges located laterally i.e. on each side of the oscillating arm, are preferably not visible from the outside when the first and second parts are snapped together.

Preferably, the second part has an at least substantially U-shaped cross-section at the location of its connection to the first part, wherein each leg of the U-shaped cross-section is allowed to bend outwardly upon insertion of the oscillating arm into the second part for connecting the first and second parts together through a snapping operation. Preferably, each leg of the U-shaped cross-section is bendable between a first position, wherein the first and second parts are connected together through a snapping operation upon insertion of the oscillating arm into the second part, and a second position, wherein the first and second parts are released from each other upon removing the oscillating arm from the second part. In other words, sliding the oscillating arm into the second part of the connecting device preferably results in the legs of the U-shaped cross-section being bend outwardly. As a result the first and the second parts of the connecting device are automatically snapped, that is clipped onto each other, using the protrusion/hole means. Both parts are automatically released from each other by sliding the oscillating arm off the second part of the connecting device.

In the alternative, the second part has an at least rectangular, preferably square shaped cross-section, wherein the first and second parts are connected through a snapping operation, and wherein vertical side walls of the second part are allowed to deform elastically or plastically, in order to clip the parts together, using the protrusion/hole means.

It is noted that the present invention is not restricted to the use of only one longitudinal strip that is particularly located in a central, channel forming groove of the wiper blade. Instead, the carrier element may comprise two, spaced-apart longitudinal strips forming the elastic, elongated carrier element, wherein the strips are disposed in opposing longitudinal grooves on longitudinal sides of the wiper blade. In the latter case the connecting device may welded, soldered, brazed or glued to the longitudinal strips. In the former case, the connecting device may be welded, soldered, brazed or glued to an elastomeric material, such as rubber, of the wiper blade.

In a preferred embodiment of a windscreen wiper device in accordance with the invention the protrusion is hingeable between the inward position and the outward position.

Particularly, the protrusion is hingeable along hinges of the second part located on opposite sides of the oscillating arm in mounted position thereof, i.e. on opposite sides of the channel arranged for inserting the oscillating arm therein. The outer edge is particularly located along an outer circumference of the second part. More in particular, the protrusion is hingeable from the inward position into the outward position upon activating a push button on the second part. Such a push button can be pressed in by hand.

In another preferred embodiment of a windscreen wiper device according to the invention the retaining means form first retaining means, and wherein the windscreen wiper device is further provided with second retaining means arranged for retaining the connecting device onto the oscillating arm, wherein the second retaining means comprises at least one protrusion provided on the first part arranged to engage the oscillating arm. Preferably, the protrusion on the first part is arranged to engage into a recess provided on a longitudinal side of the oscillating arm. In the alternative, the protrusion on the first part is arranged to engage into a hole having a closed circumference provided in the oscillating arm.

In another preferred embodiment of a windscreen wiper device in accordance with the invention the protrusion on the first part is located near an insertion opening of the channel arranged for inserting the oscillating arm therein. In other words, the recess provided on a longitudinal side of the oscillating arm is located at a larger distance to the free end of the oscillating arm than the hole in the oscillating arm cooperating with the protrusion on the second part. Accordingly, mounting or dismounting the connecting device onto or from the oscillating arm can be effected at a certain pivot angle of the oscillating arm relative to the first part.

In another preferred embodiment of a windscreen wiper device according to the invention the second part is positioned within the first part, wherein the second part has vertical side walls, wherein the first part is provided with opposite abutting surfaces for abutting against the vertical side walls of the second part, and wherein a protrusion at the location of the pivot axis extends laterally outwardly from each side wall of the second part into a hole provided on an abutting surface abutting against a respective sidewall. In the alternative or in addition thereto, the first part is provided with opposite abutting surfaces for abutting against the vertical side walls of the second part, wherein a protrusion extends laterally inwardly from each abutting surface into a hole provided on a side wall abutting against a respective abutting surface. Preferably, the second part has an at least substantially U-shaped, rectangular or square cross-section at the location of its connection to the first part, wherein the vertical side walls form legs of the cross-section.

Preferably, one of the abutting surfaces of the first part has a larger height than the other abutting surface of the first part. Hence, a so-called "afterspray effect" is avoided, wherein rain water located on the connecting device is not allowed to splash onto the windscreen to be wiped during wiping.

The present invention also refers to a wiper arrangement of a windscreen wiper device in accordance with the invention and an oscillating arm connected thereto. Particularly, for mounting or dismounting the connecting device onto or from the oscillating arm, the second part of the windscreen wiper device and the free end of the oscillating arm connected thereto are arranged to be pivoted relative to the first part of the windscreen wiper device in order to engage or disengage the protrusion on the first part into or from the recess on the longitudinal side of the oscillating arm. This can, of course, only be done when also the protrusion on the second part in all embodiments is engaged into or disengaged from the hole in the oscillating arm.

The present invention is also directed to a method for manufacturing a windscreen wiper device comprising an elastic, elongated carrier element, as well as an elongated wiper blade of a flexible material, which can be placed in abutment with a windscreen to be wiped, which wiper blade includes at least one groove, in which groove a longitudinal strip of the carrier element is disposed, wherein ends of the longitudinal strip are connected by a respective connecting piece, which windscreen wiper device comprises a connecting device for an oscillating arm, wherein the oscillating arm can be pivotally connected to the connecting device about a pivot axis near one end, characterized in that the connecting device is made of at least two parts provided with protrusion/hole means arranged for detachably connecting the parts together through a snapping operation, wherein the first part is retained onto the wiper blade and wherein the second part is provided with a channel arranged for inserting the oscillating arm therein, wherein the windscreen wiper device is provided with retaining means arranged for retaining the connecting device onto the oscillating arm, wherein the retaining means is provided with at least one downwardly extending protrusion on the second part, wherein the protrusion is movable between an inward position, wherein in mounted position the protrusion engages into a correspondingly shaped hole provided in the oscillating arm and the connecting device is retained onto the oscillating arm, and an outward position, wherein in dismounted position the protrusion disengages from the hole provided in the oscillating arm and the connecting device is released from the oscillating arm.

THE DRAWINGS

The invention will now be explained in more detail with reference to figures illustrated in a drawing, wherein FIG. 1 is a schematic and perspective view, partly in exploded view, of a main part of a windscreen wiper device and an oscillating arm according to the invention, wherein a first part and a second part of a connecting device of the windscreen wiper device is shown arranged to be connected to the oscillating arm;

FIG. 2 are side views of the oscillating arm inserted inside the second part of the connecting device of FIG. 1;

FIG. 3 corresponds to FIG. 2, but now showing schematic, perspective views;

FIG. 4 is a top view of FIG. 3;

FIG. 5 are cross-sectional views along the line A-A of FIG. 4;

DETAILED DESCRIPTION

Figure 1:
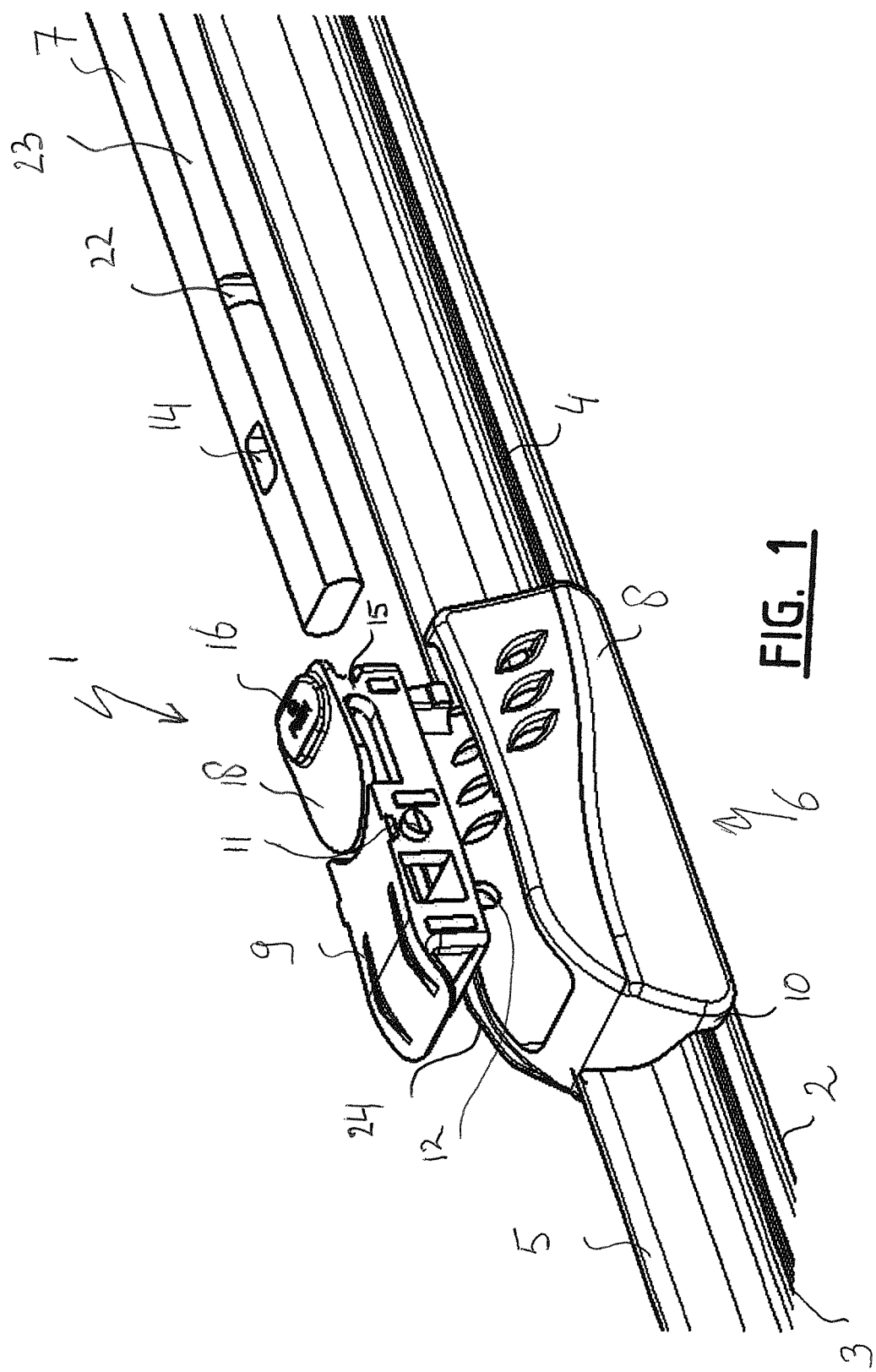
Figure 3:
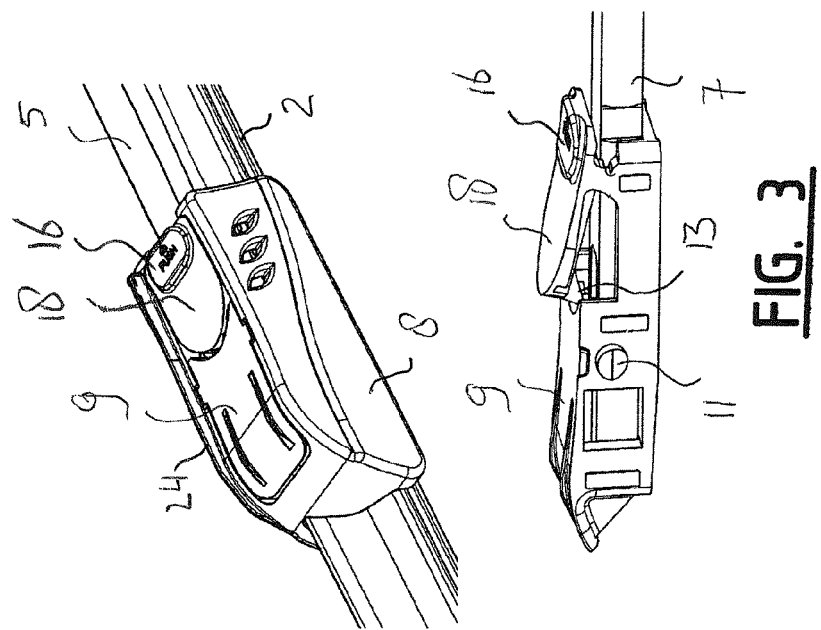

FIG. 1 shows a windscreen wiper device 1 of the "flat blade" type according to the invention. The windscreen wiper device 1 is built up of an elastomeric wiper blade 2, in the longitudinal sides of which opposing longitudinal grooves 3 are formed, and of longitudinal strips 4 made of spring band steel, which are fitted in the longitudinal grooves 3. The strips 4 form a flexible carrier element for the rubber wiper blade 2, as it were, which is thus biassed in a curved position (the curvature in operative position being that of a windscreen to be wiped). Neighbouring ends of strips 4 are interconnected on either side of the windscreen wiper device 1 by means of connecting pieces (not shown) functioning as clamping members. In this embodiment, the connecting pieces may be separate constructional elements, which may be form-locked ("positive locking" or "having positive fit"), as well as force-locked to the ends of strips 4. In another preferred variant, the connecting pieces are in one piece with the strips 4 made of spring band steel. In the latter case the connecting pieces form transverse bridges for the strips 4, as it were. Possibly, a spoiler 5 is furthermore provided.

The windscreen wiper device 1 is furthermore built up of a connecting device 6 of plastic material for an oscillating wiper arm 7. The wiper arm 7 is finalized by an extension (without an adapter). Connecting device 6 consists of a first part 8 and a second part 9 detachably connected together.

The first part 8 is retained onto the wiperblade 2, whereas the second part 9 is positioned within the first part 8, that is between parallel, upright walls thereof. Further, the first part 8 comprises clamping members 10 that are integral therewith, which engage round longitudinal sides of the strips 4 that face away from each other, as a result of which the connecting device 6 is firmly attached to the unit consisting of wiper blade 2 and strips 4. The second part 9 has a U-shaped cross-section at the location of its connection to the first part 8. The oscillating wiper arm 7 is pivotally connected to the connecting device 6 about a pivot axis near a free end thereof, and that in the following manner.

Figure 2:
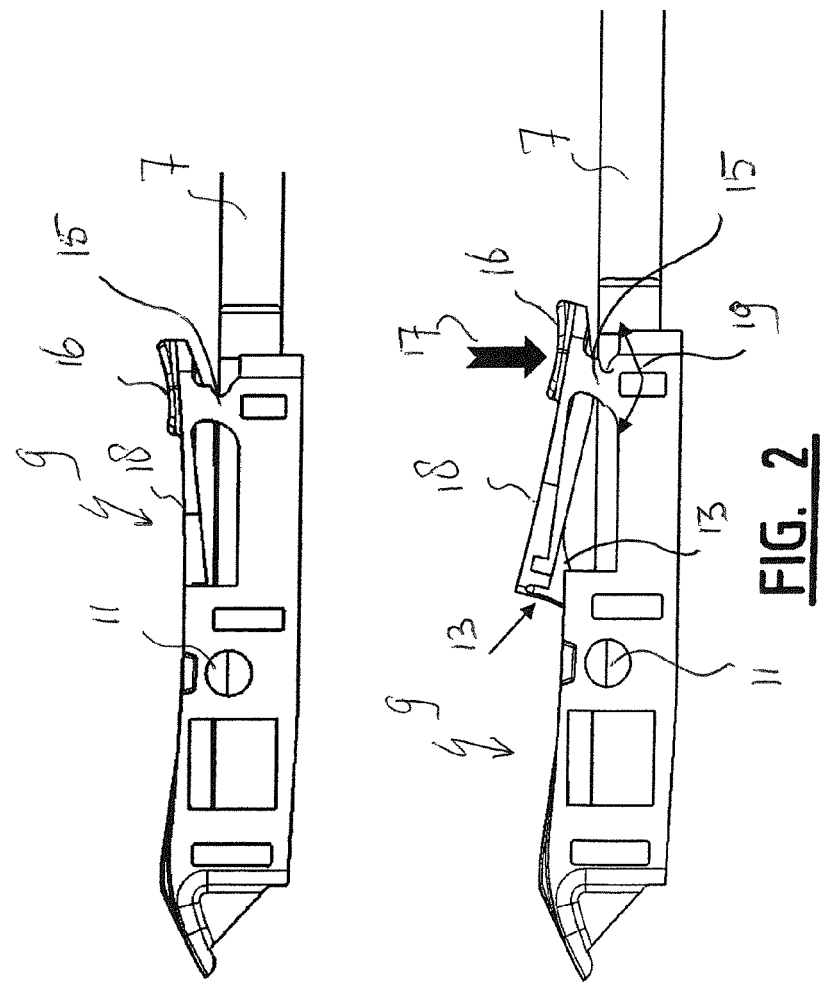
Figure 6:
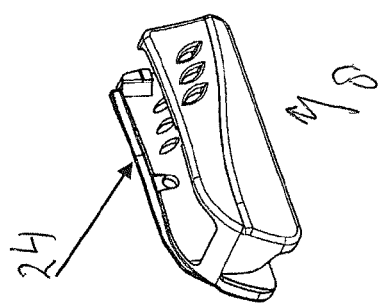
FIG. 6 are schematic, perspective views of (a part of) the first part of the connector, as well as a view form below of the connector connected to the oscillating arm.
Figure 6:
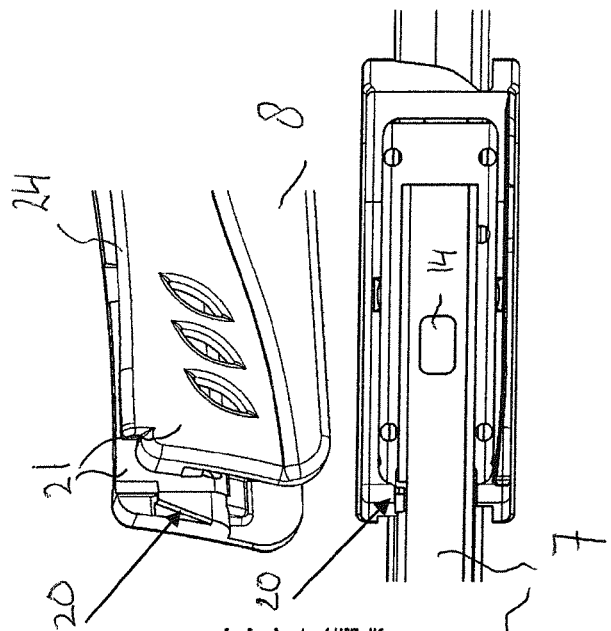

With reference to FIGS. 1 and 2, the second part 9 comprises two cylindrical protrusions 11 (only one is visible) extending outwards on either side of the second part 9, that is on each vertical side wall of its U-shaped, rectangular or square cross-section. These protrusions 11 pivotally engage in identically shaped cylindrical holes 12 (only one thereof is visible in FIGS. 1 and 2) of the first part 8. The protrusions 11 act as bearing surfaces at the location of a pivot axis in order to pivot the second part 9 (and the oscillating wiper arm 7 attached thereto) about the pivot axis near a free end of the arm 7. The protrusions 11 are preferably in one piece with the second part 9. In the alternative, the protrusions 11 are part of a single pivot pin perpendicular to the connecting device 6.

Referring to FIGS. 1, 2, 3 and 5, the second part 9 comprises a protrusion 13 extending downwardly from a top wall of the second part 9, while the oscillating arm 7 has an identically shaped hole 14 with a closed circumference at the location of its connection to the second part 9. The protrusion is hingeable between an inward position (FIG. 2 above and FIG. 5 above), wherein in a mounted position the protrusion 13 engages into the hole 14 provided in the oscillating arm 7 in order to retain the connecting device 6 onto the oscillating arm 7, and an outward position (FIG. 2 below and FIG. 5 below), wherein in a dismounted position the protrusion 13 disengages from the hole 14 provided in the oscillating arm 7, allowing the connecting device 6 to be released from the oscillating arm 3. As shown, the protrusion 13 is hingeable along two lateral hinges 15 located near an outer edge of the second part 9 and on opposite sides of the oscillating arm 7, upon activating a push button 16 on the second part 9 by hand in the direction of arrow 17. More in particular, a part 18 of the top wall of the second part 9 is hingeable about the hinges 15, wherein the push button 16 is located at a top side of the part 18 near one end thereof, and wherein the protrusion 13 is located at a bottom side of the part 18 near an opposite end thereof. By activating or deactivating the push button 16, a hinge movement in the direction of arrows 19 is obtained. The movement is a so-called seesaw movement. The hinges 15 are invisible from the outside when the first and second parts 8,9 are interconnected.

The protrusion 13 on the second part 9 and the hole 14 in the oscillating arm 7 are meant for retaining the connecting device 6 onto the oscillating arm 7 and are therefore called "first retaining means". However, in case the first retaining means would disfunction, for example when the protrusion 13 would not properly fit into the hole 14, the second part 9 and the first part 8 connected thereto would be able to move relative to the oscillating arm 7 in longitudinal direction of the wiper blade 2. In order to avoid the wiper blade 2 from coming loose, with all negative consequences involved, second retaining means are provided for. The second retaining means consist of an upwardly extending protrusion 20 on at least one of the parallel, upright walls 21 of the first part 8 cooperating with a recess 22 in the oscillating arm 7 (FIG. 1). In other words, the protrusion 20 engages into the correspondingly shaped recess 22 provided on a longitudinal (exterior) side 23 of the oscillating arm 7. The protrusion 20 may also be called a cam.

Figure 7:
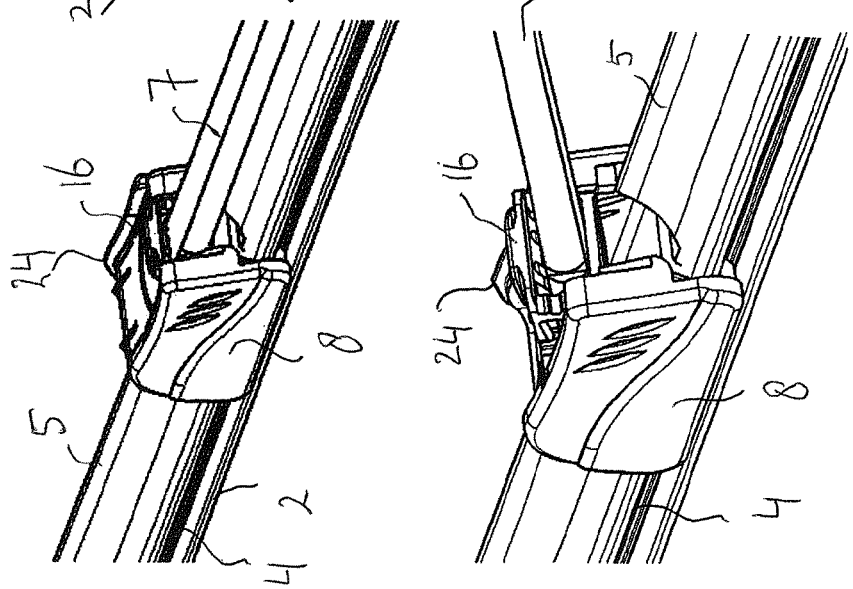
FIG. 7 shows successive steps for fitting together the connecting device and the oscillating arm according to the invention.

For mounting or dismounting the connecting device 6 onto or from the oscillating arm 7, the second part 9 and thus the free end of the oscillating arm 7 connected thereto is pivoted relative to the first part 8 (FIG. 7). While carrying out the pivot movement the protrusion or cam 20 is no longer in line with the recess 22 and cannot mutually cooperate any longer, so that the second part 9 and the first part 8 attached thereto can be released from the oscillating arm 7. This can, of course, only be done when also the protrusion 13 in all embodiments is released from the hole 14.

It is noted that one of the walls 21 is higher than the other wall 21, so that an extension 24 is obtained. During wiping rain water is kept onto the connecting device 6 due to the higher wall 21, so that the rain water is not allowed to splash onto the windscreen to be wiped.

The invention is not restricted to the variants shown in the drawing, but it also extends to other embodiments that fall within the scope of the appended claims.

The invention claimed is:

1. A windscreen wiper device comprising an elastic, elongated carrier element, as well as an elongated wiper blade of a flexible material, which can be placed in abutment with a windscreen to be wiped, which wiper blade includes at least one groove, in which groove a longitudinal strip of the carrier element is disposed, wherein ends of said longitudinal strip are connected by a respective connecting piece, which windscreen wiper device comprises a connecting device for an oscillating arm, wherein said oscillating arm can be pivotally connected to said connecting device about a pivot axis near one end, wherein said connecting device comprises at least two parts provided with protrusion/hole features arranged for detachably connecting said parts together through a snapping operation, wherein a first of the at least two parts is retained onto the wiper blade and wherein a second of the at least two parts comprises a channel arranged for inserting said oscillating arm therein, wherein said windscreen wiper device is provided with retaining structure arranged for retaining said connecting device onto said oscillating arm, wherein said retaining structure comprises at least one downwardly extending protrusion on the second part, wherein said protrusion is movable between an inward position, wherein in a mounted position said protrusion engages into a correspondingly shaped hole provided in said oscillating arm and said connecting device is retained onto said oscillating arm, and an outward position, wherein in a dismounted position said protrusion disengages from said hole provided in said oscillating arm and said connecting device is released from said oscillating arm, wherein said protrusion is hingeable from said inward position into said outward position upon activating a push button on said second part.

2. A windscreen wiper device according to claim 1, wherein said protrusion is hingeable along hinges of said second part located on opposite sides of said oscillating arm in mounted position thereof.

3. A windscreen wiper device according to claim 1, wherein said retaining structure forms first retaining means, and wherein said windscreen wiper device is further provided with second retaining means arranged for retaining said connecting device onto said oscillating arm, wherein said second retaining means comprises at least one protrusion provided on the first part arranged to engage the oscillating arm.

4. A windscreen wiper device according to claim 3, wherein said protrusion on the first part is arranged to engage into a recess provided on a longitudinal side of the oscillating arm.

5. A windscreen wiper device according to claim 3, wherein said protrusion on the first part is located near an insertion opening of said channel arranged for inserting said oscillating arm therein.

6. A windscreen wiper device according to claim 1, wherein the second part is positioned within said first part, wherein said second part has vertical side walls, wherein said first part is provided with opposite abutting surfaces for abutting against the vertical side walls of the second part, and wherein a protrusion at the location of said pivot axis extends laterally outwardly from each side wall of the second part into a hole provided on an abutting surface abutting against a respective side wall.

7. A windscreen wiper device according to claim 6, wherein one of said abutting surfaces of said first part has a larger height than the other abutting surface of said first part.

8. A wiper arrangement of the windscreen wiper device according to claim 1.

9. A wiper arrangement according to claim 8, wherein for mounting or dismounting said connecting device onto or from said oscillating arm, the second part of said windscreen wiper device and a free end of said oscillating arm connected thereto are arranged to be pivoted relative to said first part of said windscreen wiper device in order to disengage a protrusion on the first part from a recess on a longitudinal side of said oscillating arm.

10. A method for manufacturing a windscreen wiper device comprising preparing an elastic, elongated carrier element, as well as an elongated wiper blade of a flexible material, which can be placed in abutment with a windscreen to be wiped, which wiper blade includes at least one groove, in which groove a longitudinal strip of the carrier element is disposed, connecting ends of said longitudinal strip by a respective connecting piece, which windscreen wiper device comprises a connecting device for an oscillating arm, wherein said oscillating arm can be pivotally connected to said connecting device about a pivot axis near one end, wherein said connecting device is made of at least two parts provided with protrusion/hole features which operate to detachably connect said parts together through a snapping operation, wherein a first part of said at least two arts is retained onto the wiper blade and wherein a second part of the at least two parts is provided with a channel arranged for inserting said oscillating arm therein, wherein said windscreen wiper device is provided with retaining structure which operates to retain said connecting device onto said oscillating arm, wherein said retaining structure is provided with at least one downwardly extending protrusion on the second part, wherein said protrusion is movable between an inward position, wherein in a mounted position said protrusion engages into a correspondingly shaped hole provided in said oscillating arm and said connecting device is retained onto said oscillating arm, and an outward position, wherein in a dismounted position said protrusion disengages from said hole provided in said oscillating arm and said connecting device is released from said oscillating arm, and wherein the protrusion is hingeable from the inward position to said outward position in response to activating a push button on the second part.

* * * * *